(12) United States Patent
Holley et al.

(10) Patent No.: US 12,497,903 B2
(45) Date of Patent: Dec. 16, 2025

(54) MULTI-STAGE PARTIAL ADMISSION AXIAL TURBINE

(71) Applicant: RTX Corporation, Farmington, CT (US)

(72) Inventors: Brian M. Holley, Eastford, CT (US); Marc J. Muldoon, Marlborough, CT (US); Robert H. Dold, Monson, MA (US); Ulf J. Jonsson, South Windsor, CT (US); Lance L. Smith, West Hartford, CT (US); Joseph B. Staubach, New Britain, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/638,440

(22) Filed: Apr. 17, 2024

(65) Prior Publication Data

US 2025/0327410 A1    Oct. 23, 2025

(51) Int. Cl.
  *F01D 9/04*    (2006.01)
  *F01D 5/14*    (2006.01)
  (Continued)

(52) U.S. Cl.
  CPC .............. *F01D 9/041* (2013.01); *F01D 5/142* (2013.01); *F01D 15/10* (2013.01); *F01D 25/16* (2013.01)

(58) Field of Classification Search
  CPC .......... F01D 17/18; F01D 17/141; F01D 1/02; F01D 15/10; F01D 17/105; F01D 17/16;
  (Continued)

(56) References Cited

U.S. PATENT DOCUMENTS 884,719 A * 4/1908 Cramp .................. F04D 29/247
                                                 415/129
910,266 A * 1/1909 Belluzzo ................. F01D 11/08
                                                 415/173.1
(Continued)

FOREIGN PATENT DOCUMENTS

JP    H0278703 A    3/1990
JP    3686233 B2    8/2005
JP    2016017446 A    2/2016

OTHER PUBLICATIONS

Supplementary European Search Report dated Sep. 26, 2025, in connection with European Patent Application No. 25 170 164.5, 9 pages.

*Primary Examiner* — Eric J Zamora Alvarez (57) ABSTRACT

A system includes a substrate and an electrical component mounted to the substrate. The system also includes a structural enclosure positioned around lateral edges of the electrical component and mounted to the substrate. The structural enclosure includes raised walls extending away from the substrate and surrounding the electrical component. The raised walls are configured to block foreign object debris from the electrical component. The system further includes a lid connected to the substrate, where the lid covers the electrical component and the structural enclosure. The system also includes a seal positioned between the structural enclosure and the lid, where the seal is configured to be compressed when the lid is connected to the substrate. In addition, the system includes a thermal interface material positioned between and contacting the electrical component and the lid.

18 Claims, 6 Drawing Sheets

(51) Int. Cl.
*F01D 15/10* (2006.01)
*F01D 25/16* (2006.01)

(58) Field of Classification Search
CPC . F01D 5/06; F01D 5/141; F01D 5/142; F01D 5/34; F01D 9/04; F01D 9/041; F01D 9/047; F01D 25/16; F05D 2220/31; F05D 2250/411; F04D 29/247
See application file for complete search history.

(56) References Cited

U.S. PATENT DOCUMENTS

| | | | |
|---|---|---|---|
| 2,258,793 A | | 10/1941 | New |
| 2,392,463 A | * | 1/1946 | Smith ............... F01D 9/047 |
| | | | 415/191 |
| 2,603,948 A | | 7/1952 | Mims |
| 4,780,057 A | * | 10/1988 | Silvestri, Jr. ............ F01D 17/18 |
| | | | 415/185 |
| 5,269,648 A | * | 12/1993 | Freuschle ............ F01D 17/141 |
| | | | 415/154.2 |
| 9,500,085 B2 | * | 11/2016 | Smith ............... F01D 5/142 |
| 10,941,666 B2 | | 3/2021 | Davies |
| 11,028,724 B2 | * | 6/2021 | Shin ............... F01D 9/04 |

\* cited by examiner

MULTI-STAGE PARTIAL ADMISSION AXIAL TURBINE

GOVERNMENT RIGHTS

This invention was made with Government support under Contract DE-AR0001343 awarded by the United States Department of Energy, Office of ARPA-E. The Government has certain rights in this invention.

TECHNICAL FIELD

This disclosure relates generally to gas turbines. More specifically, this disclosure relates to a multi-stage partial admission axial turbine.

BACKGROUND

Industry wide design trends, increased electrification and concerns about reducing the carbon footprint of aircraft are leading to architectures in which on-board electricity generation for aircraft is produced by alternatives to combustion of carbon-containing fuel. Using jet fuel as a working fluid for Rankine cycle turbines appears to present a variety of desirable performance outcomes, including, without limitation, the opportunity to use fuel as both a cooling medium for the engine, as well as reduced carbon emissions. However, using jet fuel or other on-board liquids as working fluids for a Rankine cycle turbine for on-board electricity generation also presents significant technical challenges, including a significant mismatch between the preferred rotational operating speeds of turbines (e.g., high speed) relative to the comparatively preferred rotational operating speeds of inductive electricity generating apparatus (e.g., lower speed).

SUMMARY

This disclosure relates to a multi-stage partial admission axial turbine.

In a first embodiment, an axial turbine includes a body having a first open end and a second open end, a plenum disposed at the first open end for admitting a working fluid, and a first partial admission stage. The first partial admission stage includes a first stator annulus attached to the body, the first stator annulus comprising a first partial admission sector, the first partial admission sector comprising a passage for the working fluid received from the plenum, and disposed on a first section of the first stator annulus, wherein the first section of the first stator annulus is disposed between a first opening angle and a second opening angle, and wherein the first partial admission sector comprises a plurality of vanes to steer the working fluid in a direction of rotation. The axial turbine further includes a first rotor having an annular profile and comprising a first plurality of blades. The axial turbine includes a second partial admission stage, the second partial admission stage including a second stator annulus attached to the body comprising a second partial admission sector, the second partial admission sector comprising a passage for the working fluid received from the first partial admission stage, and disposed on a first section of the second stator annulus, wherein the first section of the second stator annulus is disposed between a third opening angle and a fourth opening angle, and wherein the first partial admission sector comprises a plurality of vanes to steer the working fluid in the direction of rotation, a second rotor having an annular profile and comprising a second plurality of blades, and one or more driveshafts connected to the first rotor and the second rotor. The first partial admission sector is disposed at a first clocking angle relative to the second partial admission sector.

In a second embodiment, a turbogenerator includes an axial turbine. The axial turbine includes a body having a first open end and a second open end, a plenum disposed at the first open end for admitting a working fluid, and a first partial admission stage. The first partial admission stage includes a first stator annulus attached to the body, the first stator annulus comprising a first partial admission sector, the first partial admission sector comprising a passage for the working fluid received from the plenum, and disposed on a first section of the first stator annulus, wherein the first section of the first stator annulus is disposed between a first opening angle and a second opening angle, and wherein the first partial admission sector comprises a plurality of vanes to steer the working fluid in a direction of rotation and a first rotor having an annular profile and comprising a first plurality of blades. The axial turbine includes a second partial admission stage. The second partial admission stage includes a second stator annulus attached to the body comprising a second partial admission sector, the second partial admission sector comprising a passage for the working fluid received from the first partial admission stage, and disposed on a first section of the second stator annulus, wherein the first section of the second stator annulus is disposed between a third opening angle and a fourth opening angle, and wherein the first partial admission sector comprises a plurality of vanes to steer the working fluid in the direction of rotation, and a second rotor having an annular profile and comprising a second plurality of blades. The axial turbine includes one or more driveshafts connected to the first rotor and the second rotor. The turbogenerator includes an electrical generator connected to the one or more driveshafts. The first partial admission sector is disposed at a first clocking angle relative to the second partial admission sector.

Examples of apparatus according to this disclosure include axial turbines wherein the first partial admission stage comprises a third partial admission sector comprising a second passage for the working fluid received from the plenum, and disposed on a second section of the first stator annulus, wherein the second section of the first stator annulus is disposed between a fifth opening angle and a sixth opening angle, and wherein the third partial admission sector comprises a plurality of vanes to steer the working fluid in the direction of rotation, wherein the second partial admission stage comprises a fourth partial admission sector comprising a second passage for the working fluid received from the plenum, and disposed on a second section of the second stator annulus, wherein the second section of the second stator annulus is disposed between a seventh opening angle and an eighth opening angle, and wherein the third partial admission sector is disposed at a second clocking angle relative to the fourth partial admission sector.

Examples of apparatus according to this disclosure include axial turbines wherein the first clocking angle and second clocking angle are of an equal magnitude.

Examples of apparatus according to this disclosure include axial turbines wherein the fifth opening angle is 180 degrees greater than the first opening angle, wherein the sixth opening angle is 180 degrees greater than the second opening angle, wherein the seventh opening angle is 180 degrees greater than the third opening angle, and wherein the eighth opening angle is 180 degrees greater than the fourth opening angle.

Examples of apparatus according to this disclosure include axial turbines wherein a difference between the first opening angle and the second opening angle is smaller than a difference between the third opening angle and the fourth opening angle.

Examples of apparatus according to this disclosure include axial turbines wherein at least one of the first partial admission stage or the second partial admission stage comprises an adjustment mechanism for changing the first clocking angle.

Examples of apparatus according to this disclosure include axial turbines wherein the adjustment mechanism comprises a ring with index holes configured to receive a pin connected to at least one of the first partial admission stage or the second partial admission stage.

Examples of apparatus according to this disclosure include axial turbines comprising a third partial admission stage, the third partial admission stage comprising: a third stator annulus attached to the body, the third stator annulus comprising a third partial admission sector, the third partial admission sector comprising a passage for the working fluid received from the second partial admission stage, and disposed on a first section of the first stator annulus, wherein the first section of the third stator annulus is disposed between a fifth opening angle and a sixth opening angle, and wherein the third partial admission sector comprises a plurality of vanes to steer the working fluid in the direction of rotation; a third rotor having an annular profile and comprising a third plurality of blades; and a fourth partial admission stage, the fourth partial admission stage comprising: a fourth stator annulus attached to the body comprising a fourth partial admission sector, the fourth partial admission sector comprising a passage for the working fluid received from the third partial admission stage, and disposed on a first section of the fourth stator annulus, wherein the first section of the second stator annulus is disposed between a seventh opening angle and an eighth opening angle, and wherein the first partial admission sector comprises a plurality of vanes to steer the working fluid in the direction of rotation; and a fourth rotor having an annular profile and comprising a fourth plurality of blades, wherein the second partial admission sector is disposed at a second clocking angle relative to the third partial admission sector, and wherein the third partial admission sector is disposed at third clocking angle relative to the fourth partial admission sector.

Examples of apparatus according to this disclosure include axial turbines wherein the first clocking angle corresponds to a predicted propagation of an acoustic wave from the first partial admission stage to the second partial admission stage, wherein the second clocking angle corresponds to a predicted convective propagation from the second partial admission stage to the third partial admission stage, and wherein the third clocking angle corresponds to a predicted axial mass flow rate from the third partial admission stage to the fourth partial admission stage.

Examples of apparatus according to this disclosure include axial turbines wherein the one or more driveshafts has a first end extending from the axial turbine and a second end extending from the axial turbine, and comprising one or more bearings supporting the one or more driveshafts at only one of the first end or the second end in an overhung configuration.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 6, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, external pressures (for example, concerns about carbon emissions) and opportunities for performance enhancement of jet engines have created interest in repurposing on-board fluids of aircraft (for example, jet fuel or ammonia) as working fluids for Rankine cycle turbines driving on board electricity generators, as an alternative to separately powering an on-board generator from combustion of jet fuel. However, using small-scale Rankine cycle turbines to power electrical generating equipment presents a variety of technical challenges. These challenges include, without limitation, the fact that the driveshafts of small gas turbines frequently operate at speeds far in excess of the speeds typically specified for on-board electrical generators. While running the onboard generator at "turbine speeds" may theoretically be possible, doing so introduces significant mechanical stresses on bearings, as well as large rotational loads on generator rotors, which are undesirable. Similarly, while it may be theoretically possible to create a step-down gearbox capable of driving a generator from the output of a small Rankine cycle turbine, this approach introduces added mass, mechanical complexity, and additional points of large rotational loads on bearings, all of which are undesirable. From a performance, design and weight perspective, a Rankine cycle turbine which can operate at the rotational speeds of an electrical generator, and directly drive such a generator, presents a lighter, simpler, more compact, and less mechanically stressful solution than interposing a gearbox, or running a generator at turbine speeds.

This disclosure provides a multi-stage partial admission axial Rankine cycle turbine which can operate at the comparatively low rotational speeds (for example, between 40,000 and 120,000 rpm) compatible with direct driving on-board electrical generation systems.

FIGS. 1 through 6 illustrate examples of individual turbine stages and assemblies of multiple stages of multi-stage partial admission axial turbines whose minimum operating speeds fall within the expected range of direct drive speeds for onboard electric generators for aircraft.

Figure 1:
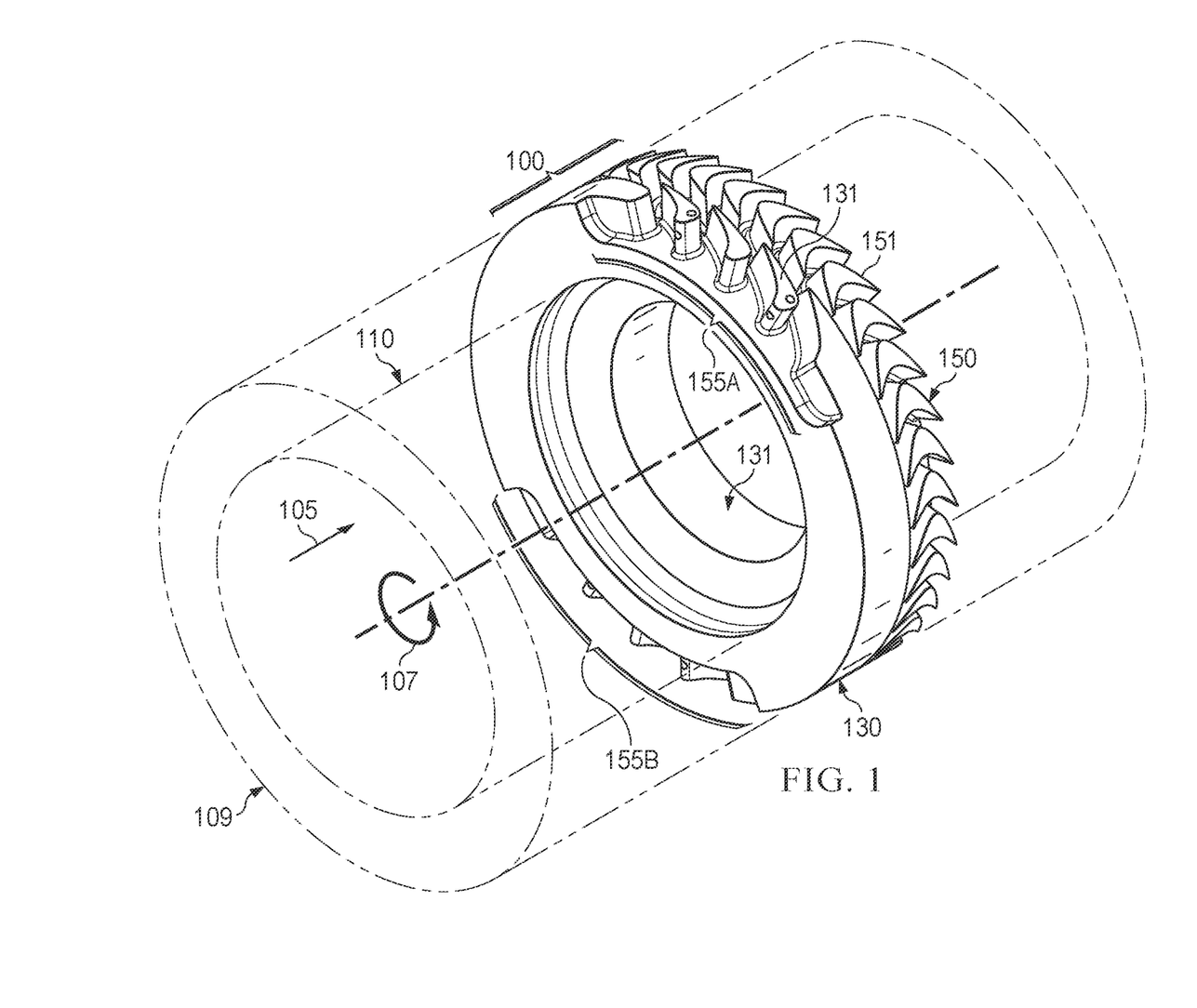
FIG. 1 illustrates an example partial admission stage of a partial admission axial turbine according to this disclosure.

FIG. 1 illustrates an example partial admission stage 100 of multi-stage partial admission axial turbine according to embodiments of this disclosure. Partial admission stage 100 comprises one of a plurality of partial admission stages of a turbine through which a heated working fluid under pressure (for example, jet fuel or ammonia) is passed in a first direction 105, and directed by the one or more vanes (for example, vane 131) a partial admission stator 130 towards the blades (for example, blade 151) of axial rotor 150.

As shown in FIG. 1, the constituent blades of axial rotor 150 (for example, blade 151) have an airfoil-shaped cross-section, causing the working fluid to move over axial rotor 150 axially, or substantially parallel to first direction 105. This is in contrast to radial rotors, which cause the working fluid to traverse the radial rotor in a radial direction (for example, from the outside of the rotor to the inside). All things being otherwise equal, for a given rotor workload, an axial turbine rotor spins at approximately half the rotational speed of a radial rotor of the same diameter. As the heated, compressed working fluid passes over the vanes of partial admission stator 130 and over the rotating blades of rotor 150, at least two things happen. First, the working fluid expands as it passes through partial admission stage 100, and the working fluid exerts a driving force on rotor 150, causing it to rotate in rotational direction 107. Depending on the respective profiles and orientations of the vanes of partial admission stator 130 and rotor 150, the driving force can some combination of impulse, or the force arising from the transfer of kinetic energy from the stream of working fluid to the blades and reaction, or the force arising from expelling gas in a direction opposite to the direction of rotation.

Rotor 150 can be connected to a driveshaft 110, which in turn, can be directly connected to one or more rotors of an onboard inductive electrical generator.

As noted elsewhere, one of the fundamental technical challenges associated with implementing a Rankine cycle turbine as a direct drive power source for an onboard electrical generator is to provide the requisite level of power to drive the generator, but at rotational speeds that are compatible and feasible with a state-of-the-art generator.

Certain embodiments according to this disclosure balance achieving power at low rotor RPMs by ganging multiple partial admission stages (for example, partial admission stage 100) connected to one or more coaxial driveshafts of an onboard electrical generator. More specifically, in certain embodiments according to the disclosure, an annular stator provides partial admission of working fluid only through one or more partial admission sectors (for example, partial admission sectors 155A and 155B in FIG. 1), wherein each partial admission sector comprises an opening between stator 130 and a body portion 109 which only partially overlaps rotor 150. In this way, the flow of working fluid towards rotor 150 is throttled by the presence of the partial admission sectors, absent mitigation, suppresses the rotational speed of rotor 150, and, by implication, the power generated at partial admission stage 100. However, in embodiments according to this disclosure, power losses associated with the loss of rotational speed due to the one or more partial admission sectors throttling the flow of working fluid to the blades of rotor 150 can be generally mitigated by adopting high impulse rotor blade geometries characterized by reduced chord to span ratios and tighter clearances between the blade tips and body portion.

Figure 3:
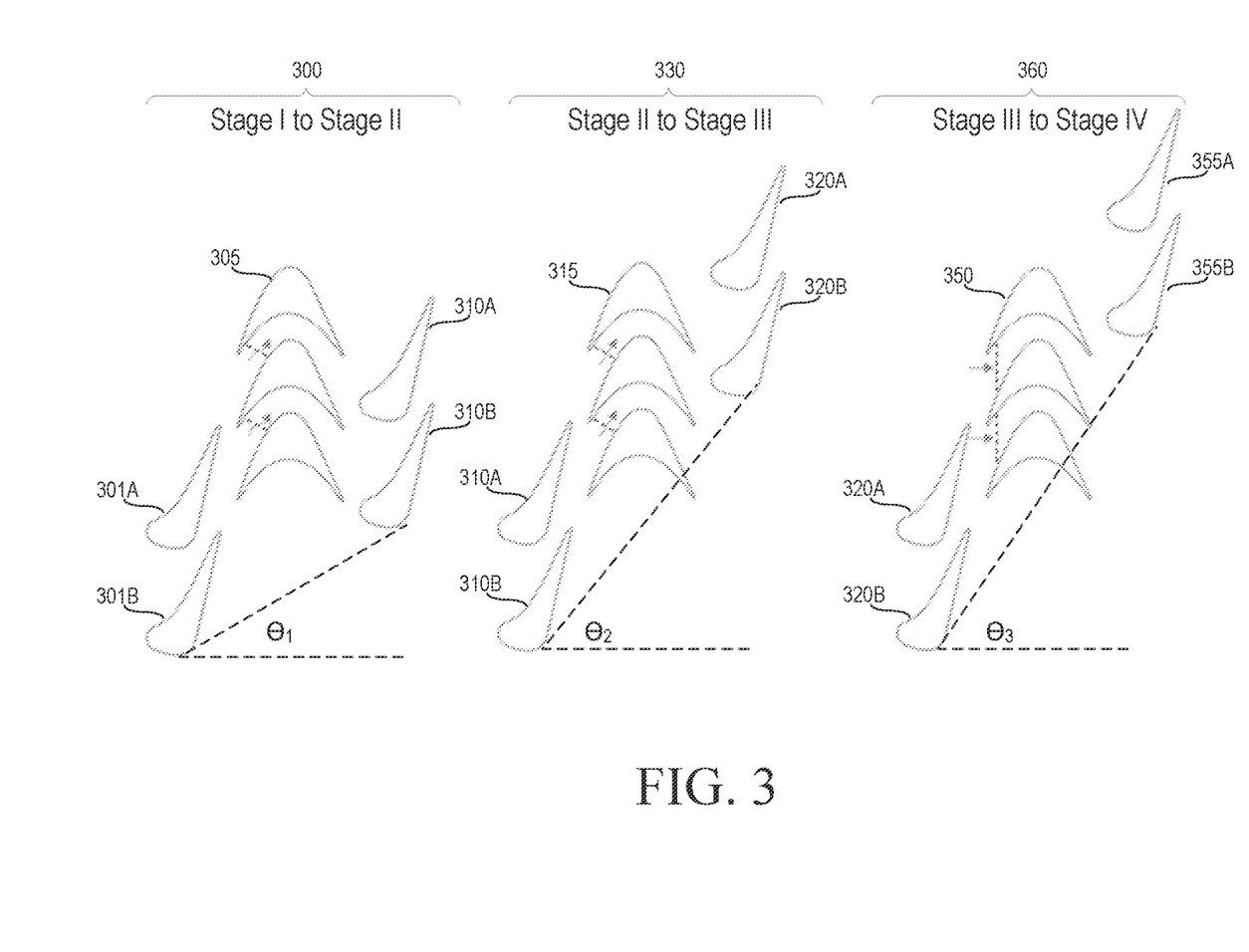
FIG. 3 illustrates an example of stage-over-stage clocking of partial admission stages of a partial admission axial turbine according to this disclosure.

As shown in FIG. 3, rotor blades according to the present disclosure have low chord-to-span ratios, characterized by a deeper "bucket" shape and less axial thickness than a lower impulse, but faster spinning rotor with a higher chord-to-span ratio. The aforementioned combination of high impulse rotor blade geometry and lower rotational operating speed of rotor 150 also permits a reduction in tip gap (the distance between the end of rotor blade 151 and body portion 109) reducing leakage of working fluid across the gap between the tips of the rotor blades. Reduced leakage across the tip gap, coupled with the fact that, in axial rotors, pressure in the working fluid primarily drops at the stator vanes in partial admission sectors 155A and 155B (rather than across the rotor blades), means that the pressure differential between the inlet and outlet side of rotor 150 is low, which in turn translates to reduced axial thrust loads on the one or more driveshafts 110. As will be discussed with reference to FIG. 6 the reduced axial thrust loads facilitated by the combination of high impulse rotor blade profiles and tighter tip gaps permits one or more driveshafts 110 to be configured in an overhung position relative to a turbogenerator.

Figure 2:
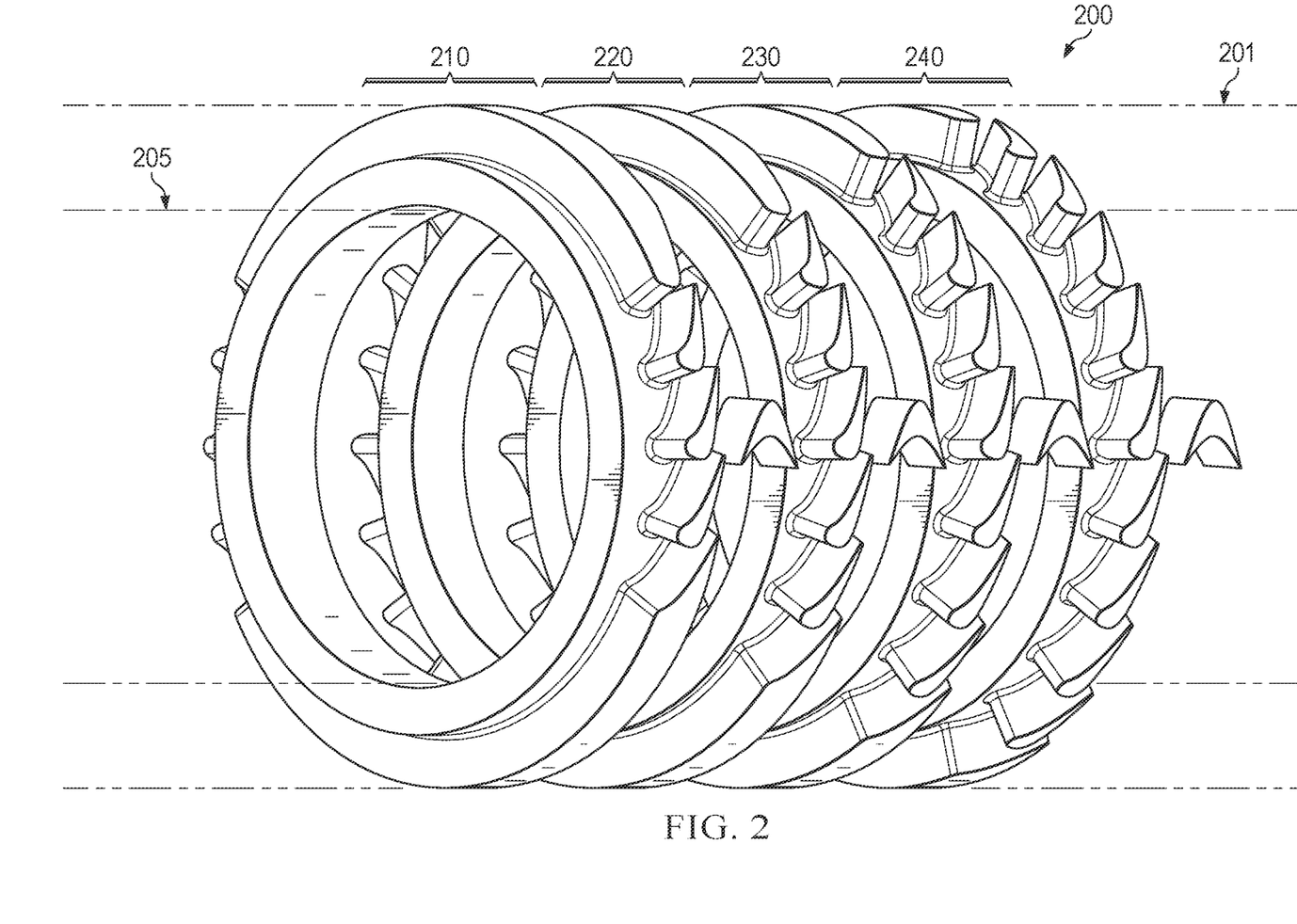
FIG. 2 illustrates an example partial admission axial turbine according to this disclosure.

FIG. 2 illustrates in partial cutaway view, components of a multi-stage partial admission axial turbine 200 according to embodiments of this disclosure. For clarity of illustration, only a single blade from each rotor stage is shown in the figure, and body 201 and one or more driveshafts 205 are shown as dotted lines.

As noted elsewhere in this disclosure, each partial admission stage comprises a high impulse rotor, which, due to the combination of a.) being part of an impulse, rather than a radial, turbine, and b.) the reduced operational speeds of multi-stage partial admission axial turbine 200, has blades with a low chord-to-span ratio. Because the thickness of the rotor depends in part on the chord-to-span ratio, a reduced chord-to-span ratio translates to a thinner, or more compact rotor, and by implication, thinner, more compact, partial admission stages. As such, the low chord-to-span ratio of rotors according to embodiments of this disclosure permits compact multi-staging of rotors and partial access stators. Multi-stage partial admission axial turbine 200 provides an example of such compact multi-staging of partial admission stages. Referring to FIG. 2, multi-stage partial admission axial turbine 200 comprises four partial admission stages, shown in the figure as first partial admission stage 210, second partial admission stage 220, third partial admission stage 230, and fourth partial admission stage 240. Each of first through fourth partial admission stages 210-240 embodies the architecture described with reference to partial admission stage 100 in FIG. 1, wherein each stage comprises a stator annulus with one or more partial admission sectors configured to receive working fluid and direct same to an axial turbine rotor adjacent to the stator annulus. Each axial turbine rotor can be connected to one or more driveshafts. Depending on the architecture, each of the four rotors shown in FIG. 2 can be on a single, common driveshaft, or alternatively, one or more of the rotors may be on one or more separate concentric driveshafts. Additionally, while in this explanatory example, multi-stage partial admission axial turbine comprises four partial admission stages, other embodiments comprising more, or fewer partial admission stages are possible and within the contemplated scope of this disclosure.

To achieve optimum performance from a ganged set of partial admission stages, such as shown in FIG. 2, certain rotor and stator parameters can change across stages to account for a variety of effects, including, without limitation, expansion of the working fluid, and slight circumferential shifts in the working fluid across stages. To accommodate expansion and spreading of the working fluid as it passes from first partial admission stage 210 through downstream stages 220-240, the rotor blades of fourth partial admission stage 240 can be longer than those of third partial admission stage 230, which, in turn can be longer than those of second partial admission stage 220, which, likewise, can be longer than those of first partial admission stage 210. Additionally, and as discussed in further detail with reference to FIG. 3, the angular size of partial admission sectors in downstream stages can be greater. As the working fluid expands and has less kinetic energy to impart to the rotor, overspinning the rotor by admitting too much working fluid becomes less of an issue.

In addition to adjusting the geometry of the partial admission sectors and rotor blade geometry to account for the spread and decrease in working fluid pressure at downstream partial admission stages, the performance of multi-stage partial admission axial turbine 200 can be further tuned by adjusting the angular alignment of vanes in a first partial admission sector to counterpart vanes in a second, downstream partial admission sector to ensure that working fluid exiting the vanes and blade row of a previous partial admission stage pass as directly as possible through the next partial admission stage. Tuning the angular alignment of partial admission sectors across stages, also referred to herein as "clocking," is discussed with reference to FIGS. 3 and 4 herein.

Referring to the illustrative example of FIG. 3, three transitions between partial admission stages are shown in the figure. In a first transition 300, working fluid is shown passing over vanes 301a-301b of a first (i.e., most upstream) partial admission sector, past first rotor 305 and entering vanes 310a-310b of a second, downstream partial admission stage. In this first transition, where the working fluid is not yet fully expanded, acoustic propagation within the working fluid is the primary determinant of where working fluid entering a vane in the first partial admission sector should meet a counterpart vane of the second partial admission sector. In this example, first clocking angle $\theta_1$ expresses the shift due to acoustic propagation in the transition between a vane of the first partial admission sector to its counterpart vane in the second partial admission sector.

In a second transition 330, the working fluid is shown passing over vanes 310a-b of the second partial admission stage, past second rotor 315, to counterpart vanes 320a and 320b of a third partial admission stage. Having already expanded during the passage from the first partial admission stage to the second partial admission stage, convective propagation is predicted as the determinative mechanism for the degree of shift from the second partial admission stage to the third partial admission stage. In this example, second clocking angle $\theta_2$, which is greater than first clocking angle $\theta_1$ expresses the shift due to convective propagation.

In a third transition 360, the working fluid is shown as passing from vanes 320a-320b of third partial admission stage, past third rotor 350 and towards vanes 355a and 355b of a fourth partial admission stage. Having already passed through two expansions in transitions 300 and 330, the working fluid is substantially expanded, and axial propagation by the blades of third rotor 350 is predicted as the determinative mechanism for the degree of shift from the third partial admission stage to the fourth partial admission stage. In this example, third clocking angle $\theta_3$, which is greater than second clocking angle $\theta_2$.

Figure 4:
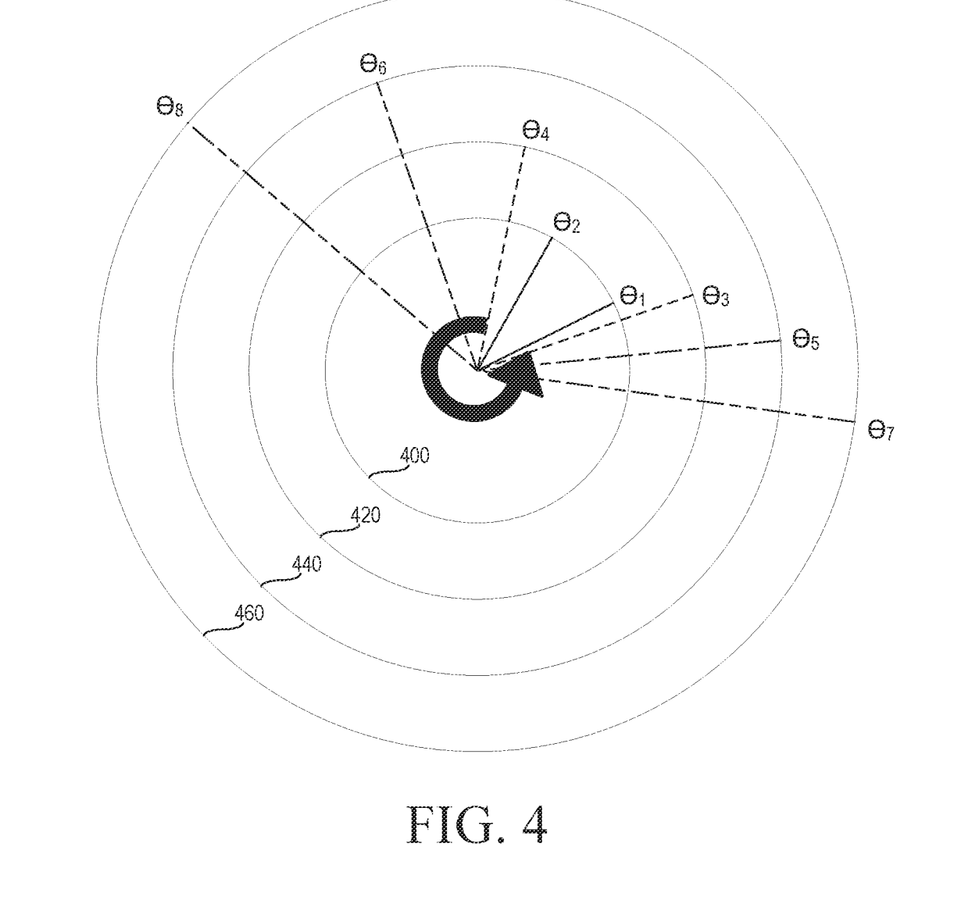
FIG. 4 illustrates an example of an example of angular and spatial relationships of partial admission sectors across stages of a multi-stage partial admission axial turbine (for example, the stage-over-stage clocking shown in FIG. 3) according to embodiments of this disclosure.

FIG. 4, shows, in schematic view, an example of angular and spatial relationships of partial admission sectors across stages of a multi-stage partial admission axial turbine (for example, turbine 200 in FIG. 2) according to embodiments of this disclosure. In the illustrative example of FIG. 4, each of the four concentric circles 400, 420, 440 and 460 represents a stator annulus of a partial admission stator of the multi-stage turbine, with first circle 400 representing the first partial admission stator of the multi-stage turbine, second circle 420 representing the second partial admission stator of the multi-stage turbine, third circle 440 representing the third partial admission sector of the multi-stage turbine and fourth circle 460 representing the fourth, and final stage of this example four-stage partial admission turbine.

Referring to the example of FIG. 4, the rays from the center to each of circles 400, 420, 440 and 460 show, for each stator annulus, the opening angles defining the bounds of the partial admission sector of the stator annulus. For example, the partial admission sector for the stator annulus represented by first circle 400 is, comparatively narrow, and bounded by first opening angle $\theta_1$ and second opening angle $\theta_2$. Similarly, the partial admission sector bounded by third opening angle $\theta_3$ and fourth opening angle 64 for the stator annulus and represented by second circle 420 is larger and offset to accommodate clocking adjustments. The partial admission sector represented by third circle 440 bounded by fifth opening angle $\theta_5$ and sixth opening angle $\theta_6$ is likewise expanded and offset for clocking adjustments. The partial admission sector represented by fourth circle 460, bounded by seventh opening angle $\theta_7$ and eighth opening angle $\theta_8$ is still further expanded and offset for clocking adjustments.

As FIG. 4 illustrates, in addition to the opening angles progressing in the direction of rotation of the multi-stage turbine due to clocking adjustments for, without limitation, acoustic propagation, convective propagation and axial propagation, as described with reference to FIG. 3, the angular dimensions of each partial admission sector expand to reflect the expansion of the working fluid and the diminishing capacity of the working fluid, once expanded through one or more partial admission stages, to overspin a rotor and/or driveshaft.

Figure 5:
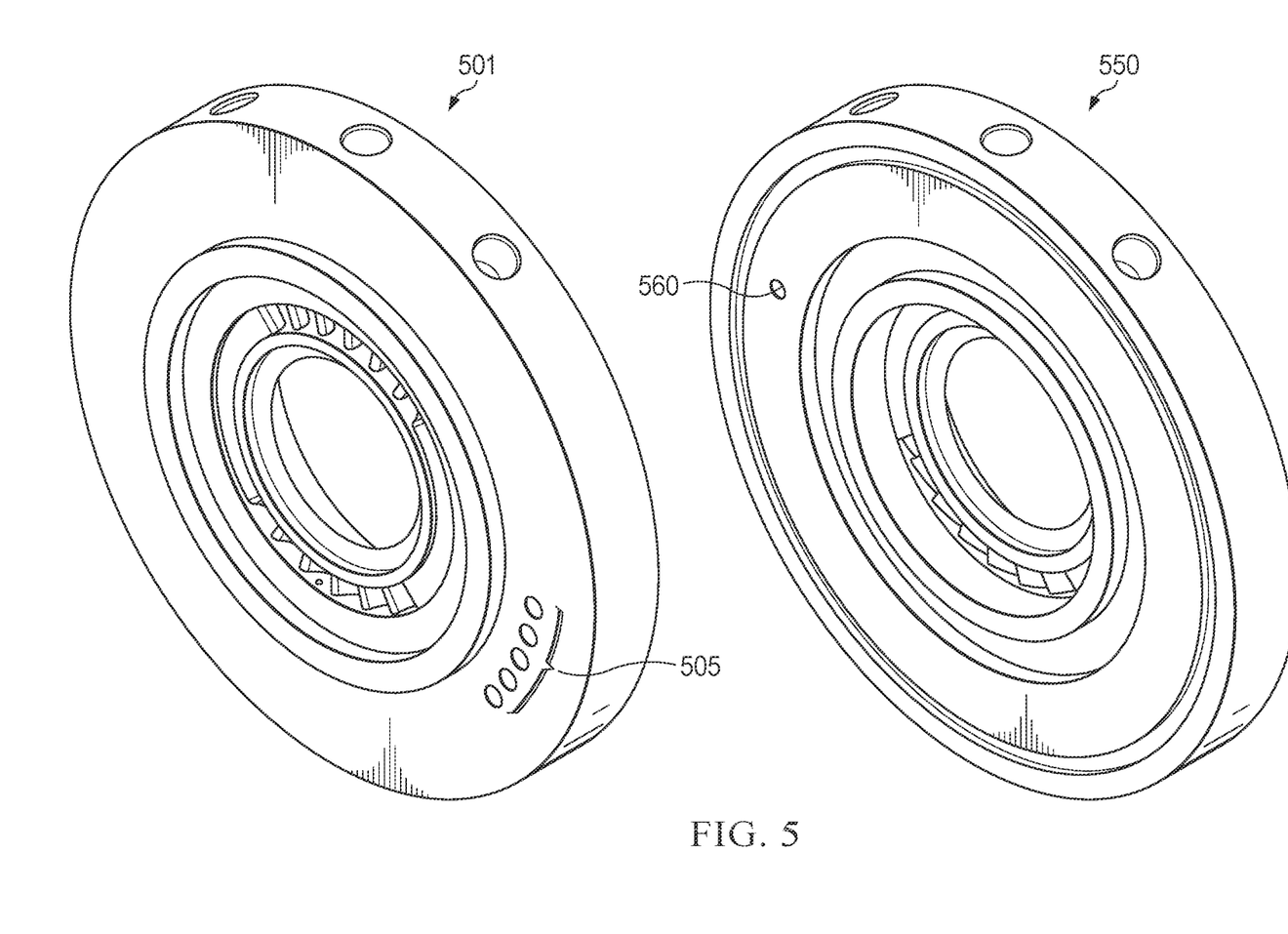
FIG. 5 illustrates an example adjustment mechanism for clocking angles according to this disclosure.

FIG. 5 illustrates a pair of partial admission stages comprising an adjustment mechanism for tuning a clocking angle between the admission stages. As discussed with reference to FIGS. 3 and 4, it is possible to model and generally predict clocking angles at which working fluid will pass directly from an upstream partial admission stage to a downstream partial admission stage, real-world experience points to the possibility of unexpected, changed or other factors confounding ex ante predictions of proper clocking angles. For example, the operational speed of a multi-stage turbine may need to be reduced to accommodate noise ordinances, or use of a different working fluid or generator may otherwise change the operational properties of the system of which a multi-stage turbine is a component. Accordingly, embodiments according to this disclosure can include adjustment mechanisms for changing or further tuning clocking angles between partial admission stages.

Referring to the explanatory example of FIG. 5, a first partial admission stage 501 is shown, along with an adjacent, downstream second partial admission stage 550. First partial admission stage 501 comprises an arc pattern of indexing holes 505 disposed at regular intervals. Each indexing hole of arc pattern of indexing holes 505 is sized to engage with a pin 560 in second partial admission stage. In this way, the clocking angle between first partial admission stage 501 and second partial admission stage 550 can be changed and tuned to suit current conditions or a current application.

Figure 6:
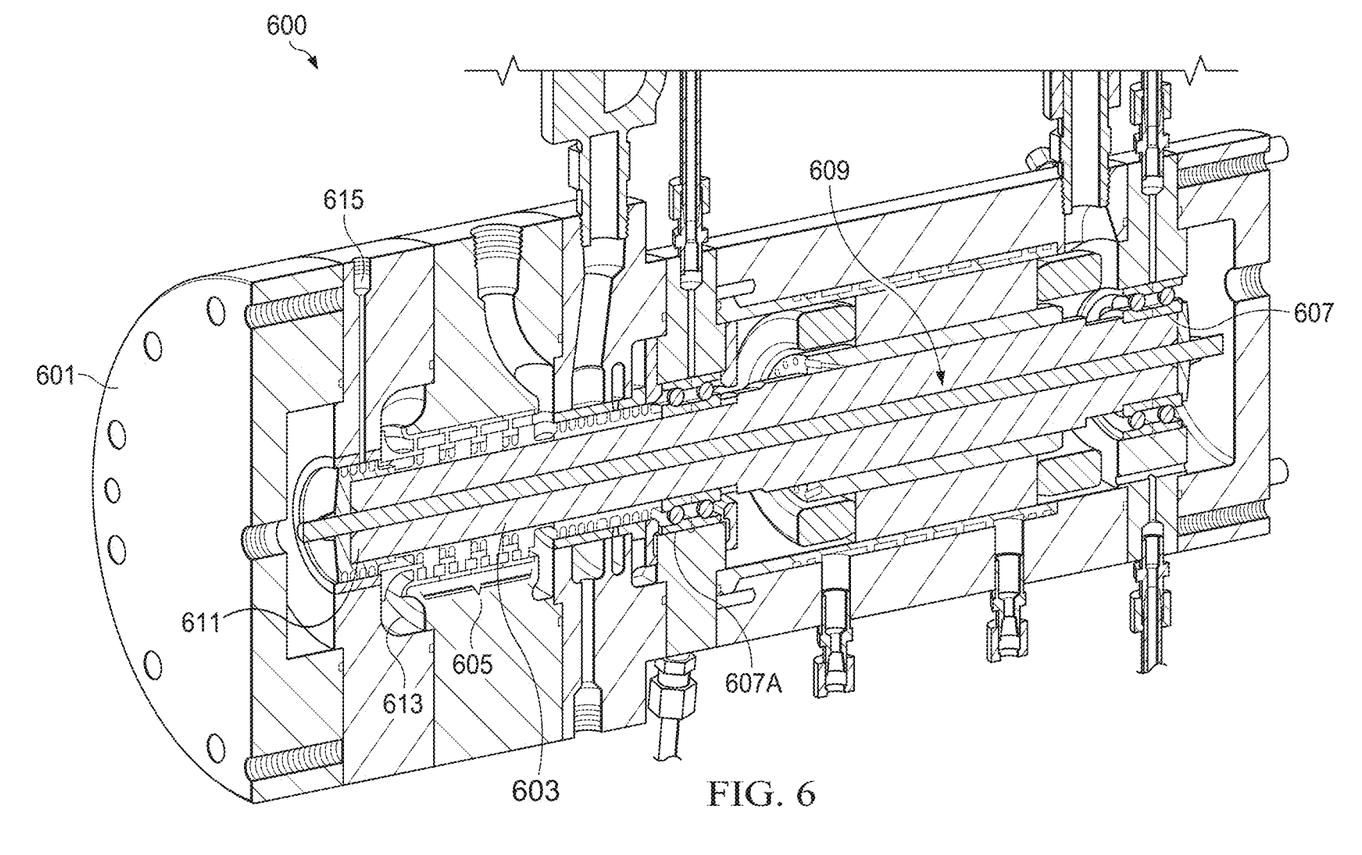
FIG. 6 illustrates an example turbogenerator incorporating a partial admission axial turbine according to this disclosure.

FIG. 6 illustrates, in cutaway view, an example of a direct drive turbogenerator 600 comprising a four-stage partial admission axial turbine 605 according to embodiments of this disclosure. Turbogenerator 600 comprises a main body 601, along whose central axis, one or more driveshafts 603 are connected to each of the four rotors of four-stage partial admission axial turbine 605. As noted elsewhere in this disclosure, though, inter alia, the use of an axial turbine, and lowering the rotational speed of the rotors, the tip gaps of the rotors of turbine 605 are reduced, and by implication, pressure differentials within turbine 605 creating axial thrust loads on bearings supporting the one or more driveshafts 603. Accordingly, rotational support for one or more driveshafts 603 is only provided by first and second bearing sets 607A and 607B on either side of inductive generator 609. In other words, the portion of one or more driveshafts 603 is overhung, and there is no bearing at first end 611 of the one or more driveshafts 603. In this example, turbine 605 comprises, or contacts, plenum 613, into which heated working fluid under pressure is injected through port 615.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An axial turbine, comprising:
a body having a first open end and a second open end;
a plenum disposed at the first open end for admitting a working fluid;
a first partial admission stage, the first partial admission stage comprising:
a first stator annulus attached to the body, the first stator annulus comprising a first partial admission sector, the first partial admission sector comprising a passage for the working fluid received from the plenum, and disposed on a first section of the first stator annulus, wherein the first section of the first stator annulus is disposed between a first opening angle and a second opening angle, and wherein the first partial admission sector comprises a plurality of vanes to steer the working fluid in a direction of rotation; and
a first rotor having an annular profile and comprising a first plurality of blades;
a second partial admission stage, the second partial admission stage comprising:
a second stator annulus attached to the body comprising a second partial admission sector, the second partial admission sector comprising a passage for the working fluid received from the first partial admission stage, and disposed on a first section of the second stator annulus, wherein the first section of the second stator annulus is disposed between a third opening angle and a fourth opening angle, and wherein the first partial admission sector comprises a plurality of vanes to steer the working fluid in the direction of rotation;
a second rotor having an annular profile and comprising a second plurality of blades; and
one or more driveshafts connected to the first rotor and the second rotor,
wherein the first partial admission sector is disposed at a first clocking angle relative to the second partial admission sector, and
wherein at least one of the first partial admission stage or the second partial admission stage comprises an adjustment mechanism for changing the first clocking angle.

2. The axial turbine of claim 1,
wherein the first partial admission stage comprises a third partial admission sector comprising a second passage for the working fluid received from the plenum, and disposed on a second section of the first stator annulus, wherein the second section of the first stator annulus is disposed between a fifth opening angle and a sixth opening angle, and wherein the third partial admission sector comprises a plurality of vanes to steer the working fluid in the direction of rotation,
wherein the second partial admission stage comprises a fourth partial admission sector comprising a second passage for the working fluid received from the plenum, and disposed on a second section of the second stator annulus, wherein the second section of the second stator annulus is disposed between a seventh opening angle and an eighth opening angle, and
wherein the third partial admission sector is disposed at a second clocking angle relative to the fourth partial admission sector.

3. The axial turbine of claim 2, wherein the first clocking angle and the second clocking angle are of an equal magnitude.

4. The axial turbine of claim 2, wherein the fifth opening angle is 180 degrees greater than the first opening angle, wherein the sixth opening angle is 180 degrees greater than the second opening angle, wherein the seventh opening angle is 180 degrees greater than the third opening angle, and wherein the eighth opening angle is 180 degrees greater than the fourth opening angle.

5. The axial turbine of claim 1, wherein a difference between the first opening angle and the second opening angle is smaller than a difference between the third opening angle and the fourth opening angle.

6. The axial turbine of claim 1, wherein the adjustment mechanism comprises a ring with index holes configured to receive a pin connected to at least one of the first partial admission stage or the second partial admission stage.

7. The axial turbine of claim 1, further comprising:

a third partial admission stage, the third partial admission stage comprising:

a third stator annulus attached to the body, the third stator annulus comprising a third partial admission sector, the third partial admission sector comprising a passage for the working fluid received from the second partial admission stage, and disposed on a first section of the third stator annulus, wherein the first section of the third stator annulus is disposed between a fifth opening angle and a sixth opening angle, and wherein the third partial admission sector comprises a plurality of vanes to steer the working fluid in the direction of rotation;

a third rotor having an annular profile and comprising a third plurality of blades; and a fourth partial admission stage, the fourth partial admission stage comprising:

a fourth stator annulus attached to the body comprising a fourth partial admission sector, the fourth partial admission sector comprising a passage for the working fluid received from the third partial admission stage, and disposed on a first section of the fourth stator annulus, wherein the first section of the second stator annulus is disposed between a seventh opening angle and an eighth opening angle, and wherein the first partial admission sector comprises a plurality of vanes to steer the working fluid in the direction of rotation; and a fourth rotor having an annular profile and comprising a fourth plurality of blades, wherein the second partial admission sector is disposed at a second clocking angle relative to the third partial admission sector, and wherein the third partial admission sector is disposed at a third clocking angle relative to the fourth partial admission sector.

8. The axial turbine of claim 7, wherein the first clocking angle corresponds to a predicted propagation of an acoustic wave from the first partial admission stage to the second partial admission stage, wherein the second clocking angle corresponds to a predicted convective propagation from the second partial admission stage to the third partial admission stage, and wherein the third clocking angle corresponds to a predicted axial mass flow rate from the third partial admission stage to the fourth partial admission stage.

9. The axial turbine of claim 1, wherein the one or more driveshafts has a first end extending from the axial turbine and a second end extending from the axial turbine, and further comprising:

one or more bearings supporting the one or more driveshafts at only one of the first end or the second end in an overhung configuration.

10. A turbogenerator comprising:

an axial turbine, comprising:

a body having a first open end and a second open end;

a plenum disposed at the first open end for admitting a working fluid;

a first partial admission stage, the first partial admission stage comprising:

a first stator annulus attached to the body, the first stator annulus comprising a first partial admission sector, the first partial admission sector comprising a passage for the working fluid received from the plenum, and disposed on a first section of the first stator annulus, wherein the first section of the first stator annulus is disposed between a first opening angle and a second opening angle, and wherein the first partial admission sector comprises a plurality of vanes to steer the working fluid in a direction of rotation; and a first rotor having an annular profile and comprising a first plurality of blades;

a second partial admission stage, the second partial admission stage comprising:

a second stator annulus attached to the body comprising a second partial admission sector, the second partial admission sector comprising a passage for the working fluid received from the first partial admission stage, and disposed on a first section of the second stator annulus, wherein the first section of the second stator annulus is disposed between a third opening angle and a fourth opening angle, and wherein the first partial admission sector comprises a plurality of vanes to steer the working fluid in the direction of rotation;

a second rotor having an annular profile and comprising a second plurality of blades;

one or more driveshafts connected to the first rotor and the second rotor; and an electrical generator connected to the one or more driveshafts, wherein the first partial admission sector is disposed at a first clocking angle relative to the second partial admission sector and wherein at least one of the first partial admission stage or the second partial admission stage comprises an adjustment mechanism for changing the first clocking angle.

11. The turbogenerator of claim 10, wherein the first partial admission stage comprises a third partial admission sector comprising a second passage for the working fluid received from the plenum, and disposed on a second section of the first stator annulus, wherein the second section of the first stator annulus is disposed between a fifth opening angle and a sixth opening angle, and wherein the third partial admission sector comprises a plurality of vanes to steer the working fluid in the direction of rotation, wherein the second partial admission stage comprises a fourth partial admission sector comprising a second passage for the working fluid received from the plenum, and disposed on a second section of the second stator annulus, wherein the second section of the second stator annulus is disposed between a seventh opening angle and an eighth opening angle, and wherein the third partial admission sector is disposed at a second clocking angle relative to the fourth partial admission sector.

12. The turbogenerator of claim 11, wherein the first clocking angle and the second clocking angle are of an equal magnitude.

13. The turbogenerator of claim 11, wherein the fifth opening angle is 180 degrees greater than the first opening angle,
wherein the sixth opening angle is 180 degrees greater than the second opening angle,
wherein the seventh opening angle is 180 degrees greater than the third opening angle, and
wherein the eighth opening angle is 180 degrees greater than the fourth opening angle.

14. The turbogenerator of claim 10,
wherein a difference between the first opening angle and the second opening angle is smaller than a difference between the third opening angle and the fourth opening angle.

15. The turbogenerator of claim 10, wherein the adjustment mechanism comprises a ring with index holes configured to receive a pin connected to at least one of the first partial admission stage or the second partial admission stage.

16. The turbogenerator of claim 10, further comprising:
a third partial admission stage, the third partial admission stage comprising:
a third stator annulus attached to the body, the third stator annulus comprising a third partial admission sector, the third partial admission sector comprising a passage for the working fluid received from the second partial admission stage, and disposed on a first section of the third stator annulus, wherein the first section of the third stator annulus is disposed between a fifth opening angle and a sixth opening angle, and wherein the third partial admission sector comprises a plurality of vanes to steer the working fluid in the direction of rotation;
a third rotor having an annular profile and comprising a third plurality of blades; and
a fourth partial admission stage, the fourth partial admission stage comprising:
a fourth stator annulus attached to the body comprising a fourth partial admission sector, the fourth partial admission sector comprising a passage for the working fluid received from the third partial admission stage, and disposed on a first section of the fourth stator annulus, wherein the first section of the second stator annulus is disposed between a seventh opening angle and an eighth opening angle, and wherein the first partial admission sector comprises a plurality of vanes to steer the working fluid in the direction of rotation; and
a fourth rotor having an annular profile and comprising a fourth plurality of blades,
wherein the second partial admission sector is disposed at a second clocking angle relative to the third partial admission sector, and
wherein the third partial admission sector is disposed at a third clocking angle relative to the fourth partial admission sector.

17. The turbogenerator of claim 16,
wherein the first clocking angle corresponds to a predicted propagation of an acoustic wave from the first partial admission stage to the second partial admission stage,
wherein the second clocking angle corresponds to a predicted convective propagation from the second partial admission stage to the third partial admission stage, and
wherein the third clocking angle corresponds to a predicted axial mass flow rate from the third partial admission stage to the fourth partial admission stage.

18. The turbogenerator of claim 10, wherein the one or more driveshafts has a first end extending from the axial turbine and a second end extending from the axial turbine, and further comprising:
one or more bearings supporting the one or more driveshafts at only one of the first end or the second end in an overhung configuration.

* * * * *